(12) United States Patent
Pan

(10) Patent No.: US 6,641,108 B1
(45) Date of Patent: Nov. 4, 2003

(54) SOLENOID VALVE

(76) Inventor: Zhaokeng Pan, No. 8-404 Renmin Road, Foshan City, Guangdong Province, 528000, P.R. (CN)

(*) Notice: Subject to any disclaimer, the term of this patent is extended or adjusted under 35 U.S.C. 154(b) by 0 days.

(21) Appl. No.: 09/763,435

(22) PCT Filed: Aug. 20, 1999

(86) PCT No.: PCT/CN99/00122
§ 371 (c)(1),
(2), (4) Date: Apr. 3, 2001

(87) PCT Pub. No.: WO00/11386
PCT Pub. Date: Mar. 2, 2000

(30) Foreign Application Priority Data

Aug. 21, 1998 (CN) .......................................... 92840088
Aug. 21, 1998 (CN) .......................................... 98240087

(51) Int. Cl.[7] .............................................. F16K 31/02
(52) U.S. Cl. ............................... 251/129.09; 137/613
(58) Field of Search ................... 251/129.09, 129.15, 251/129.18; 137/613, 628, 630.16, 630.17

(56) References Cited

U.S. PATENT DOCUMENTS

| 3,556,143 A | * | 1/1971 | Nally ........................ 137/589 |
|---|---|---|---|
| 3,864,031 A | | 2/1975 | Hossfeld et al. |
| 4,428,356 A | * | 1/1984 | Kemmner .................... 123/585 |
| 4,428,558 A | * | 1/1984 | Odogaki et al. .............. 251/65 |
| 4,441,521 A | * | 4/1984 | Brown et al. ................ 137/613 |
| 4,442,997 A | * | 4/1984 | Idogaki et al. ......... 251/129.15 |
| 4,496,134 A | * | 1/1985 | Idogaki et al. ................ 251/65 |
| 4,838,954 A | * | 6/1989 | Perach ............. 251/129.15 X |
| 4,913,114 A | * | 4/1990 | Kalippke et al. ...... 123/339.25 |
| 4,940,031 A | * | 7/1990 | Mann ..................... 123/339.13 |
| 5,065,718 A | * | 11/1991 | Suzuki et al. .......... 123/339.25 |
| 5,199,456 A | * | 4/1993 | Love et al. ............. 137/613 X |
| 5,199,459 A | * | 4/1993 | Mullally ..................... 137/613 |

FOREIGN PATENT DOCUMENTS

EP  0 364 898 A2  4/1990  ........... F16K/31/10

* cited by examiner

*Primary Examiner*—Gene Mancene
*Assistant Examiner*—Eric Keasel
(74) *Attorney, Agent, or Firm*—Webb Ziesenheim Logsdon Orkin & Hanson, P.C.

(57) ABSTRACT

The solenoid valve of this invention comprises an electromagnet with a rotator disposed in at least one side of the valve body. The shaft of the rotator is provided with the valve members to open or close the valve port. The solenoid valve has advantages such as high attraction force, less power, and is easy to continuously control.

5 Claims, 3 Drawing Sheets

SOLENOID VALVE

BACKGROUND OF THE INVENTION

1. Field of the Invention

The invention relates to a gas solenoid valve and, more particularly, to a closed rotary gas solenoid valve for gas flow control.

2. Description of Related Art

A guardless solenoid electromagnet structure employed in a current gas solenoid valve has a flatter pull characteristics, has a smaller attraction force, has a large power loss, typically cannot execute concurrent closing of the gas pipeline, and has the characteristics shown in FIG. 1. Another type of gas solenoid valve adopts a solenoid guarded electromagnet, which has a rather steep pull characteristics as shown in FIG. 2. Due to the constraint of the power consumption and bulk factors, when a larger flow is needed, an aperture enlargement of the gas solenoid valve and elongation of the operating stroke are required. A further type of the gas solenoid valve employs an epsilon structural clapper electromagnet having a rather steep pull characteristics. When the operating clearance is enlarging, its attraction attenuates rapidly, and the solenoid valve is unable to realize the linear regulation of gas via the continuous current control, while the electromagnet can only reside in on-off state via the input of the square wave current to the coil, to attain the goal of the gas regulation through a variation of on-off time ratio of the electromagnet by changing the duty cycle of the on-off time. Using this switch regulation mode, a gas pulsation shall be generated in regulation, thereby the problems of the solenoid valve abrasion due to the frequently mechanical vibration of the electromagnet, and the intrinsic vibration frequency of the electromagnet, must be lower than the input current frequency occurred. If a closing function is concurrently operated by the solenoid valve, since at this time the electromagnetic attraction force is a minimum, difficulties shall appear when a closing elastic force is needed. The force exerted on the valve member by the compressed gas and the viscosity force of the rubber valve member have to be overcome. When more gas is required, diameters of the valve port and rubber valve member should be enlarged, the armature stroke has to be elongated, and the power loss, weight and volume of the electromagnet must be increased. At this moment, normal operation cannot be performed due to the extremely low intrinsic vibration frequency of the electromagnet.

SUMMARY OF THE INVENTION

The main object of the invention is to provide a rotary gas solenoid valve having a low power loss, a large aperture and a long operating stroke.

Another object of the invention is to provide a double closure continuous controlled gas solenoid valve.

A rotary gas solenoid valve provided by the invention comprises a valve casing installed with an inlet and an outlet. A guarded rotary electromagnet is mounted on a side of the valve casing. The guarded rotary electromagnet comprises an iron core, a coil, a rotary armature, and a seating. A valve support is fastened at the position of an axial end of the rotary armature shaft of the electromagnet corresponding to the inlet or outlet valve port. A valve member is mounted on the valve support.

Another rotary gas solenoid valve provided by the invention comprises a valve casing installed with an inlet, an outlet, a coil, a rotary armature, and a seating. A valve support is fastened at the position of the axial end of the rotary armature shaft of the electromagnet corresponding with the inlet or outlet valve port. A valve member is mounted on the valve support. A guardless rotary electromagnet is also mounted on another side of the valve casing. The guardless rotary electromagnet comprises an iron core, a coil, a rotary armature, and a seating. A valve support is fastened at the position of an axial end of the rotary armature shaft of the electromagnet corresponding with the inlet or outlet valve support.

According to the rotary gas solenoid valve, a reset spring is mounted in the guarded or guardless electromagnet, one end of the spring being fixed on the iron core or the seating and another end of the spring being mounted on a side of the rotary armature or an arm fastened with the axial end of the armature shaft.

According to the rotary gas solenoid valve, a rubber-sealing ring is mounted therein between the shaft of the rotary-type armature and a bearing positioning hole of the valve casing.

According to the rotary gas solenoid valve, an adjusting screw is installed therein on the reset spring mounted in the guardless rotary electromagnet.

BRIEF DESCRIPTION OF THE DRAWINGS

Incorporated with the drawings, a preferred embodiment of the invention is described in detail in which.

DETAILED DESCRIPTION OF THE INVENTION

Figure 1:
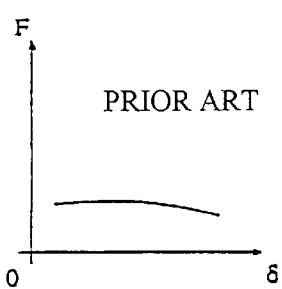
FIG. 1 shows pull characteristics of a guardless solenoid electromagnet employed in the prior art.
Figure 2:
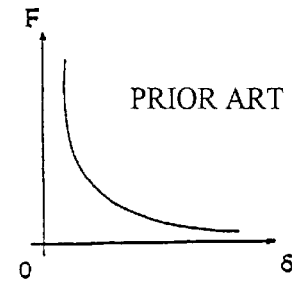
FIG. 2 shows pull characteristics of a guarded solenoid electromagnet employed in the prior art.
Figure 4:
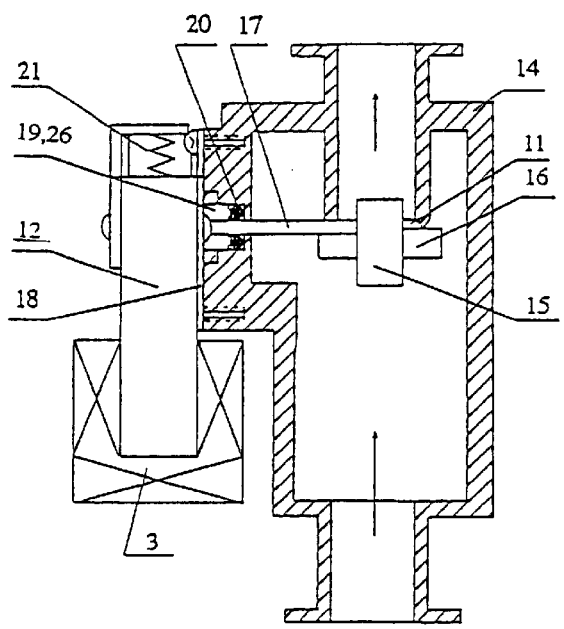
FIG. 4 is a structural schematic of a first embodiment of the invention.
Figure 5:
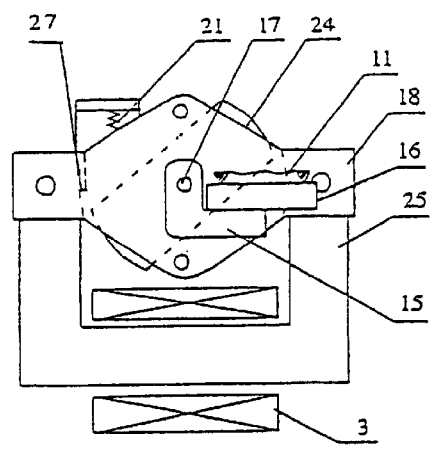
FIG. 5 is a side view of FIG. 4 with a valve casing removed.

Referring to FIG. 4 and FIG. 5, there is shown a schematic of a first embodiment of a rotary gas solenoid valve of the invention, which consists of a valve casing 14 and a guarded electromagnet 12 mounted on a side of the valve casing 14. An inlet and outlet valve port 11 is installed at the inner chamber of the valve casing 14. A positioning hole 26 of a bearing case 19 of an armature shaft 17 is opened on a side plane of the valve casing 14 with the bearing case 19 of electromagnet shaft 17 and an axial end of shaft 17 being mounted and positioned here. A rubber sealing ring 20 is mounted on the shaft 17 in the positioning hole 26. The guarded rotary electromagnet 12 comprises an iron core 25, a coil 3, a rotary armature 24, and a seating 18. The guarded rotary electromagnet 12 is fixed on a side plane of the valve casing 14 via its iron core 25 and seating 18. A reset spring 21 is installed between an arm fastened with its rotary armature 24 or the axial end of the armature shaft 17 and the seating 18 or the iron core 25. A valve support 15 is fastened at the position of the axial end of shaft 17 corresponding to the outlet valve port 11. Valve member 16 is mounted on the valve support 15. A guard 27 and the seating 18 are merged into a whole and are locate don the positions corresponding to the two convex cambered surfaces of the rotary armature 24 respectively. In a case of de-energization, the inlet and outlet valve ports are in the closed state due to the action of the reset spring. After coil 3 is energized, the opening and closing can be controlled for the outlet valve port 11 by the rotary gas solenoid valve described above.

Figure 3:
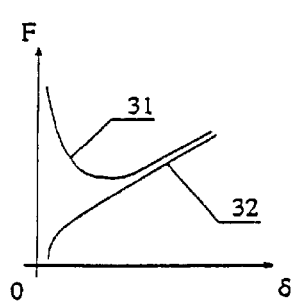
FIG. 3 shows pull characteristics of the rotary electromagnet.

Both side end faces of the rotary armature 24 have an equidistant clearance with respect to the corresponding side faces of the iron core, and the guarded rotary electromagnet has a large initial attraction force, its pull characteristics being shown at the curve 31 in FIG. 3. After put on operation, the coil current can be reduced or converted to a coil having a smaller rated current and enough attraction is still retained.

Figure 6:
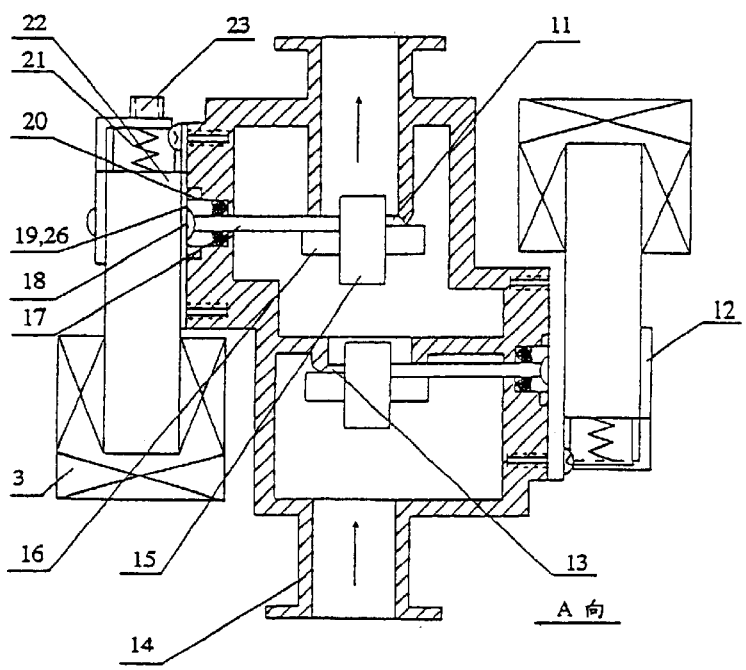
FIG. 6 is a structural schematic of a second embodiment of the invention.
Figure 7:
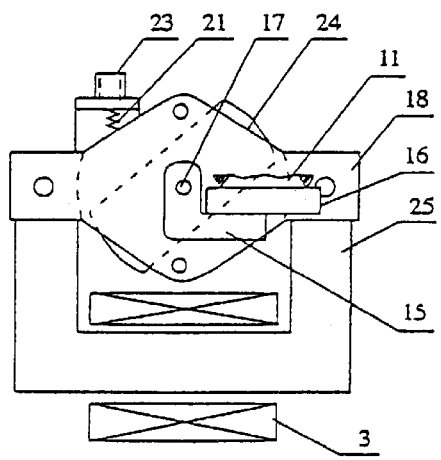
FIG. 7 is a side view of FIG. 6 with a valve casing removed.

A second embodiment of the invention is shown in FIG. 6. and FIG. 7. A rotary gas solenoid valve of the embodiment is a double closure continuously controlled gas solenoid valve, which consists of a valve casing 14 and rotary electromagnets 12, 22 mounted on both sides of valve casing 14. A burning gas outlet valve port 11 and a burning gas inlet port 13 are installed on the upper and lower portions of the inner chamber in the valve casing 14. Positioning holes 26 of a bearing case 19 of an armature shaft 17 are opened on both side symmetrical planes of the valve casing 14 respectively with the shaft bearing case 19 of the rotary electromagnets 12, 22 and the axial end of the shaft 17 being mounted and positioned here. A rubber sealing ring 20 is mounted on the shaft 17 in the positioning hole 26. The rotary electromagnets 12, 22 are fixed on both side planes of the valve casing 14 via seating 18. Reset springs 21 are mounted on the two rotary electromagnets 12, 22, respectively, one end being mounted on an iron core 25 or the seating 18 and another end being mounted on a side of a rotary armature 24 or an arm fastened with the axial end of armature shaft 17. With regards to the guardless rotary electromagnet 22 used for the closing or the regulation, an adjusting screw 23 is also mounted on the reset spring 21 to correct the systemic error formed by various factors. On installation, the rubber-sealing ring 20 is mounted on the shaft in the positioning hole. A valve support 15 is fastened at the position of the axial end of the shaft 17 corresponding with the outlet valve port 11 or the inlet valve port 13, and a valve member 16 is mounted on the valve support 15. In the embodiment, the guarded rotary electromagnet 12 is mounted the right side of the valve casing 14 shown in FIG. 6 and carries out the opening and closing control to the inlet valve port 13. The guardless rotary electromagnet 22 is mounted on the left side of the valve casing shown in FIG. 6 and carries out the closing to the outlet valve port 11 and the gassing continuous control. That is, the guarded rotary electromagnet 12 is used for the first stage closure, while the guardless rotary electromagnet 22 is used for the second stage closure, thereby the double stage closure of the solenoid valve and the continuously controlled gas flow are performed.

In a case of the rotary electromagnet de-energization, the inlet valve port 13 and the outlet valve port 11 are in a closed state due to the action of the reset spring, thereby the double closure action is performed. When power is turned on in operation, one of the valve ports is fully opened by the guarded rotary electromagnet 12, while the guardless rotary electromagnet 22 controls the gas flow of another valve port via its coil current variation. The mounting positions of the guarded and guardless rotary electromagnets on the valve casing can be interchanged.

Figure 9:
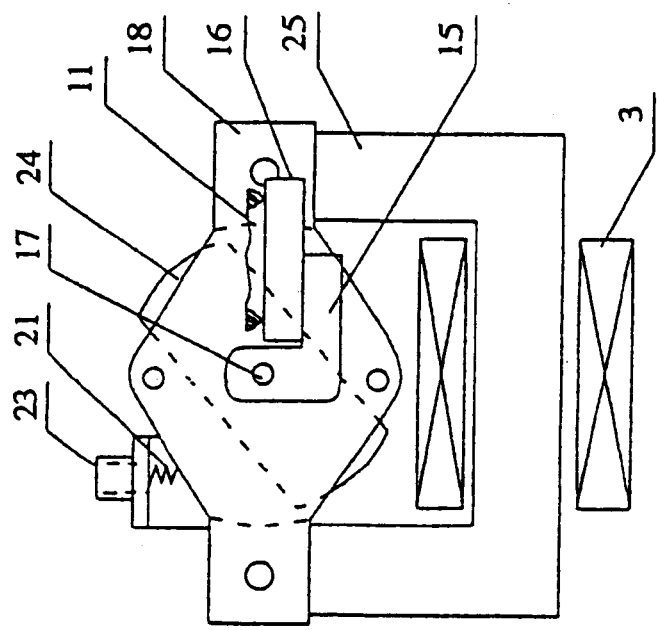
FIG. 9 is a side view of FIG. 8 with a valve casing removed.
Figure 8:
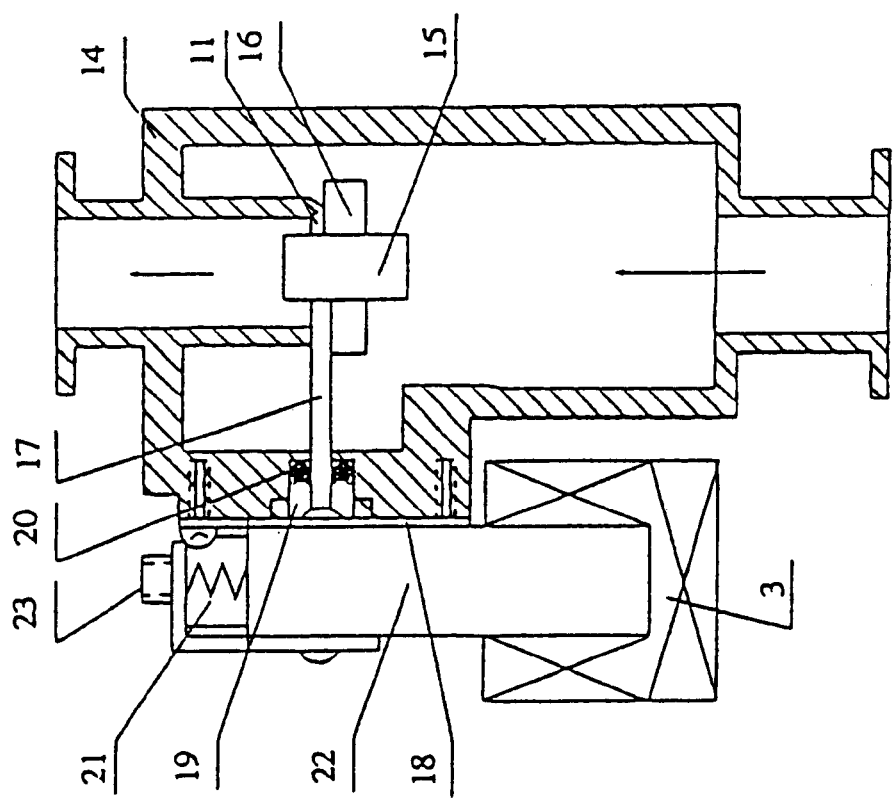
FIG. 8 is a structural schematic of a third embodiment of the invention.

Referring to FIG. 8 and FIG. 9, there is shown a schematic of a third embodiment of a rotary gas solenoid valve of the invention, which consists of a valve casing 14 and a guardless rotary electromagnet 22 mounted on a side of the valve casing 14. An inlet and outlet valve port 11 is installed in the inner chamber of the valve casing 14, and a positioning hole 26 of a bearing case 19 of an armature shaft is opened on a side plane of the valve casing 14. The bearing case 19 of the electromagnet shaft 17 and the axial end of the shaft 17 are mounted and positioned here, and a rubber-sealing ring 20 is mounted on the shaft 17 in the positioning hole 26. The guardless rotary electromagnet 22 comprises an iron core 25, a coil 3, a rotary armature 24, and a seating 18. The rotary armature 24 is supported on the seating 18 fastened to the iron core 25 via the shaft 17 and the bearing case 19. The guardless rotary electromagnet 22 is fixed on a side plane of the valve casing 14 via the iron core 25 and seating 18. A reset spring 21 is installed between the rotary armature 24 and seating 18. An adjusting screw 23 is also installed on the reset spring 21 for correction of the systemic error formed by various factors. A valve support 15 is fastened at the position of the axial end of shaft 17 corresponding with the outlet valve port 11, and a valve member 16 is mounted on the valve support 15. After coil 3 is energized, it can carry out the closure or continuous control to the gassing of the outlet valve port 11 via variation of the coil current. The end faces on both sides of the armature 24 have an equidistant clearance with respect to the corresponding side faces of the iron core 25. Consequently, it has the features of a flat pull characteristics and a large initial attraction force. The coil current can be easily changed, the operating stroke can be adjusted and a quasi-linearly continuous control of the operating stroke can be carried out, as shown in the curve 32 of FIG. 3. This electromagnet is suitable for fabrication of the closed gas regulating valve.

In a case of de-energization, the outlet valve port 11 in a closed state by the action of the reset spring 21, thereby a closing action can be provided.

The feature of a large initial attraction in the rotary electromagnet has been employed in the invention. Thereby, at the moment of starting, enough of an attraction force can be used to overcome the closing force of the reset spring, the force exerted on the rubber valve member by the compressed-gas, and the adhesion between the rubber valve member and valve port. If the rotary electromagnet was employed to elongate the operation stroke, the valve member stroke could be easily extended only by elongation for length of the convex cambered faces on both sides of the rotary armature and the corresponding concave cambered faces on both sides of the iron core, with no need to increasing the power loss of the electromagnet.

In contrast to the prior art, the following advantages are provided: (1) low power loss, large gas flow, and facilitate of continuous control; and (2) since no wearing parts exist, good reliability, safety, and longer service life can be attained.

What is claimed is:
1. A rotary gas solenoid valve comprising:
 a valve casing installed with an inlet valve port and an outlet valve port;
 a guarded rotary electromagnet mounted on a side of the valve casing, the guarded rotary electromagnet including an iron core, a coil, a rotary armature, and a seating;

a valve support fastened at a position of an axial end of the rotary armature of the guarded rotary electromagnet corresponding with the outlet valve port or the inlet valve port; and a valve member mounted on the valve support, wherein a reset spring is mounted on the guarded rotary electromagnet, one end of the reset spring fixed on the iron core or the seating, another end of the reset spring mounted on a side of the rotary armature or an arm fastened with the axial end of a shaft of the rotary armature, and wherein an adjusting screw is installed on the reset spring.

2. A rotary gas solenoid valve, comprising:

a valve casing installed with an inlet valve port and an outlet valve port;

a guarded rotary electromagnet mounted on a side of the valve casing, the guarded rotary electromagnet including an iron core, a coil, a rotary armature, and a seating;

a valve support fastened at a position of an axial end of the rotary armature of the guarded rotary electromagnet corresponding with the outlet valve port or the inlet valve port;

a valve member mounted on the valve support;

a guardless rotary electromagnet mounted on another side of the valve casing, the guardless rotary electromagnet including an iron core, a coil, a rotary armature, and a seating;

a second valve support being fastened at a position of an axial end of the armature shaft of the guardless rotary electromagnet corresponding with the other of the outlet valve port or the inlet valve port; and a second valve member being mounted on the second valve support.

3. The rotary gas solenoid valve according to claim 2, wherein a rubber-sealing ring is mounted on a shaft of the rotary armature in a bearing positioning hole of the valve casing.

4. The rotary gas solenoid valve according to claim 2, wherein a reset spring is mounted on the guardless rotary electromagnet, one end of the reset spring fixed on the iron core or the seating, another end of the reset spring mounted on a side of the rotary armature or an arm fastened with the axial end of a shaft of the rotary armature.

5. The rotary gas solenoid valve according to claim 4, wherein an adjusting screw is installed on the reset spring.

* * * * *

UNITED STATES PATENT AND TRADEMARK OFFICE
CERTIFICATE OF CORRECTION

PATENT NO. : 6,641,108 B1  Page 1 of 1
DATED : November 4, 2003
INVENTOR(S) : Zhaokeng Pan It is certified that error appears in the above-identified patent and that said Letters Patent is hereby corrected as shown below:

<u>Title page,</u>
Item [57], ABSTRACT,
Line 6, "and is easy to continuously" should read -- and ease of continuous --.

<u>Column 1,</u>
Line 12, "pull characteristics" should read -- pull characteristic --.
Lines 17-18, "characteristics" should read -- characteristic --.

<u>Column 3,</u>
Line 7, "locate don" should read -- located on --.
Lines 22-23, "Fig. 6. and Fig. 7" should read --Fig. 6 and Fig. 7 --
Line 52, "mounted the" should read -- mounted on the --.

<u>Column 4,</u>
Line 39, "port 11 in" should read -- port 11 is in --.
Line 54, "power loss of" should read -- power loss to --.
Line 57, "and facilitate" should read -- and facilitating --.

Signed and Sealed this

Fifteenth Day of June, 2004

JON W. DUDAS
*Acting Director of the United States Patent and Trademark Office*